United States Patent [19]

Ito et al.

[11] 3,745,322
[45] July 10, 1973

[54] WELDING PROCESS PREVENTING THE BOND BRITTLENESS OF LOW-ALLOY STEELS

[75] Inventors: Yoshimori Ito; Masahiko Ikeda; Kiyoshi Bessyo, all of Nishinomiya, Japan

[73] Assignee: Sumitomo Metal Industries Limited, Osaka, Japan

[22] Filed: Dec. 24, 1969

[21] Appl. No.: 887,885

[52] U.S. Cl. .................................. 219/137, 219/126
[51] Int. Cl. ............................................. B23k 9/00
[58] Field of Search ....................... 219/137, 74, 73, 219/76, 126

[56] References Cited
UNITED STATES PATENTS

2,141,021  12/1938  Rooke et al. ...................... 219/137
2,233,455  3/1941  Larson ............................ 219/137 X
2,416,379  2/1947  Cohn ................................ 219/137
2,642,965  6/1953  Danhier .......................... 219/137 X
3,162,751  12/1964  Robbins ............................ 219/137

Primary Examiner—J. V. Truhe
Assistant Examiner—George A. Montanye
Attorney—Watson, Cole, Grindle & Watson

[57] ABSTRACT

This invention is to establish a new welding process for welding a high strength steel, low-temperature service steel or low-alloy steel by first depositing a high notch toughness metal on each root face of a joint, then welding the deposited high notch toughness metal layers and heat-treating the weld bond with the welding heat to prevent weld bond brittleness.

4 Claims, 14 Drawing Figures

Patented July 10, 1973 3,745,322

INVENTORS,
YOSHINORI ITO
MASAHIKO IKEDA
KIYOSHI BESSYO

BY Watson, Cole, Grindle & Watson
ATTORNEYS

WELDING PROCESS PREVENTING THE BOND BRITTLENESS OF LOW-ALLOY STEELS

This invention relates to a new welding process preventing the bond brittleness produced at time of welding a high tensile strength steel, low-temperature service steel or so-called low-alloy steel.

One of the greatest technical difficulties in welding such low-alloy steel is that the notch toughness of the weld bond is greatly reduced by welding heat. Because of the thermal characteristics produced by welding, the grains at the weld bond become so coarse as to produce a high temperature transformation structure and therefore, even if the base plate has excellent notch toughness, it is remarkably reduced. The term "weld bond" means a base plate zone in a very narrow range from the fusion line in a part of the heat affected zone. The phenomenon of the reduction of the notch toughness in such a zone is generally called "bond brittleness."

The weld bond brittleness generally tends to become greater with an increase of the welding heat input. Particularly, where the shape of the weld has a discontinuity, and there is a further welding defect such as lack of weld penetration, undercut, a welding crack or slag inclusion at or near the weld bond, the notch effect caused by such weld defects will be added to the reduction of the notch toughness in the above mentioned weld bond to make a brittle fracture more likely to occur.

There are known such various measures of preventing weld bond brittleness as (1) welding by reducing the welding heat input with a sacrifice of the welding productivity, (2) in case of a normalized or rolled steel, reheating the welded part with a gas flame to be above the $A_{c3}$ transformation temperature (above about 900° C.) so that the toughness may recover and (3) providing in the base plate more than 3.5% Ni to reduce the tendency of the weld bond to become brittle.

However, each of these measures reduces the welding productivity, elevates the cost of the steel plate or limits the kind of the steel to be welded and is not a defect eliminating measure at all.

An object of the present invention is to weld low-alloy steels by first depositing a high notch toughness metal on each root face of a joint, then welding said deposited high notch toughness metal layers and heat-treating the weld bond with the heat from the welding to prevent bond brittleness.

In the accompanying drawings:

FIGS. 1 to 3 show an embodiment of the welding process of the present invention wherein;

FIGS. 4 and 5 show another embodiment of the welding process of the present invention wherein;

FIGS. 6 to 11 show a modified embodiment of the second welding process of the present invention wherein;

Figure 1:
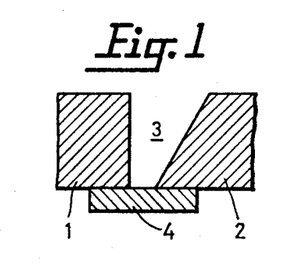
FIG. 1 is an elevation of a joint before depositing a high notch toughness metal.
Figure 2:
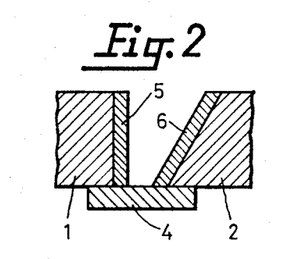
FIG. 2 is an elevation of the joint after depositing the high notch toughness metal on each root face of a joint.
Figure 3:
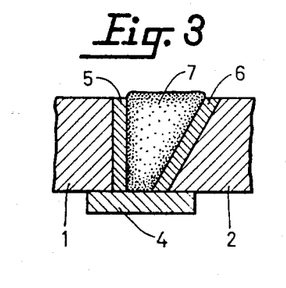
FIG. 3 is an elevation of the joint after the completion of the welding.

Base plates 1 and 2 are provided with a groove opposed to each other by providing a proper clearance 3 between them on a water-cooled copper shoe 4 shown in FIGS. 1 to 3. High notch toughness metal layers 5 and 6 are first deposited on the respective root faces and the above mentioned parts 5 and 6 are then welded with a deposited metal 7 by any welding method so that the base plates 1 and 2 may be perfectly welded through the deposited high notch toughness metal layers 5 and 6.

The high notch toughness metal layer is deposited and formed on the root face of the joint so as to be of any desired thickness, which is determined by the dimensions and composition of the steel plates, and welded by using such welding methods as covered arc welding, $CO_2$ arc welding, tungsten inert-gas arc welding, inert metal arc welding, electrogas arc welding, submerged arc welding or plasma spray. The weld bond becomes brittle at the time of such deposition but is heat-treated by the heat of the subsequent welding so that the notch toughness of said part may recover. If the thickness of the deposited layer is kept in a proper range, it will be heated above the $A_{c3}$ transformation temperature (about 900° C.) by the subsequent welding so that the reduction of the notch toughness may be recovered by the normalizing effect of such temperature. Further, if the thickness of the deposited layer is kept in a proper range and the layer is water-cooled just after the deposition, it will be heated below the $A_{c1}$ transformation temperature (about 650° C.) so that the reduction of the notch toughness may be recovered by a quenching and tempering effect. Such heat-treatment as normalization or quenching and tempering is a method generally taken to improve the notch toughness of steel plates.

Figure 4:
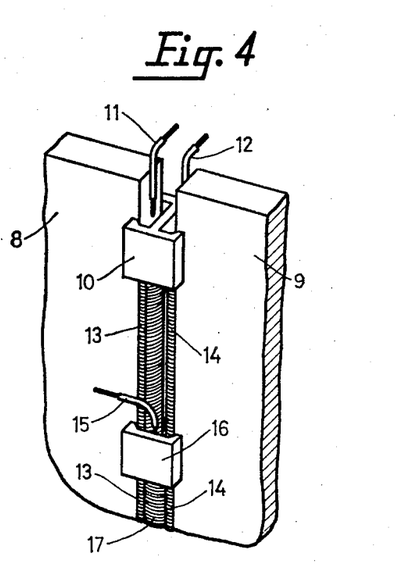
FIG. 4 is a perspective view showing a high notch toughness metal deposited and then welding the metal layers.

Now, a preferred process of the invention is given below with reference to the perspective view shown in FIG. 4 as an application using an electrogas arc welding method.

Figure 5:
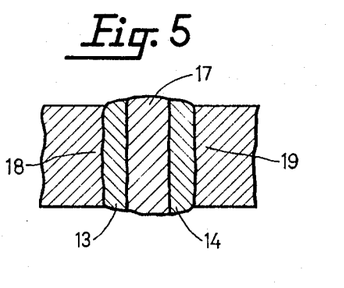
FIG. 5 is an elevation of the joint after the completion of the welding.
Figure 6:
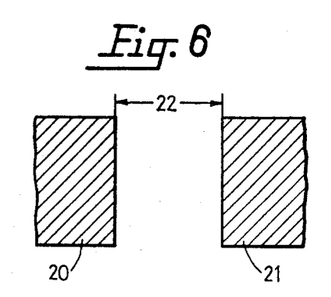
FIG. 6 is a plan view showing plates set before the welding.

8 and 9 are plates to be welded a proper root opening between them. 10 is a copper shoe set to deposit a metal on the end surfaces of the plates to be welded. This copper shoe has a length of approximately 20 mm. in the longitudinal direction and is held properly so as to slide upward with the progress of the deposition by electrogas arc welding heads 11 and 12 arranged above it. Layers 13 and 14 are deposited as a metal having a high notch toughness. An electrogas arc welding head 15 for finally welding the plates is then arranged and held properly so that a weld may be made within a copper shoe 16 sliding with the progress of the weld. 17 is the formed weldment. A welded joint is thus formed of the deposited layer 13, weld metal 17 and deposited layer 14. A cross-sectional view of the weld joint thus made by the process of the present invention is shown in FIG. 5. Here the weld bonds 18 and 19 are heated to be above the $A_{C3}$ transformation temperature (900° C.) by the welding heat through the deposited layers 13 and 14 so as to be normalized into a fine grained structure. Thus it is possible to prevent bond brittleness.

The following is a description of a modified process for preventing the reduction of the notch toughness of the weld by a quenching and tempering effect.

The difference of the modified process from the above disclosed process is to provide a water-cooling means behind the deposited metal.

Figure 7:
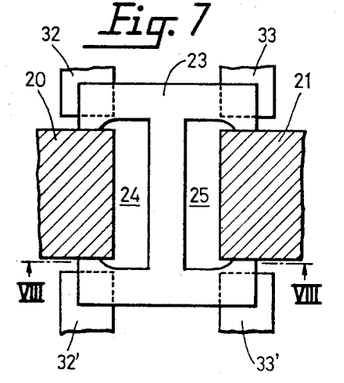
FIG. 7 is a plan view of the plates just before depositing a high notch toughness metal.
Figure 8:
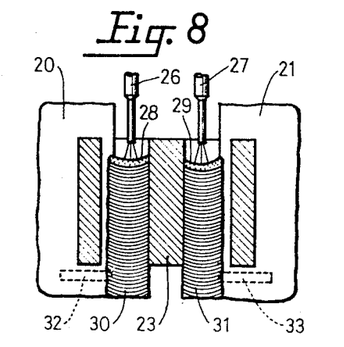
FIG. 8 is a vertical section taken on line VIII—VIII in FIG. 7 showing water-cooling in the course of depositing the metal.
Figure 9:
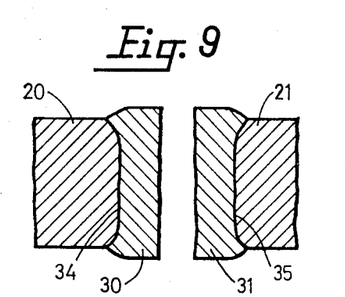
FIG. 9 is a plan view of the joint after depositing the metal.
Figure 10:
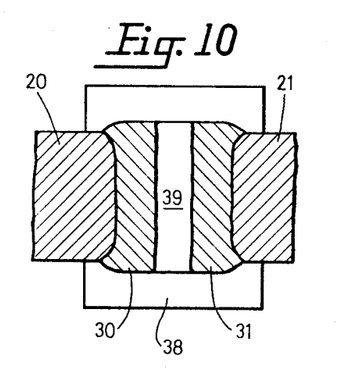
FIG. 10 is a plan view of the joint before welding.
Figure 11:
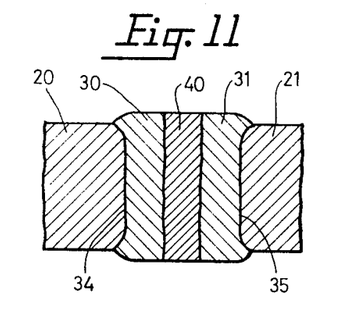
FIG. 11 is a plan view of the joint after the welding.

In FIGS. 6 to 11, base plates 20 and 21 are opposed to each other with a determined joint clearance 22 between them and, as shown in FIG. 7, copper shoe 23 is fitted between the end surfaces of the base plates 20 and 21 so as to form clearances 24 and 25 respectively between it and the base plates 20 and 21. This copper shoe 23 has a length of approximately 20 mm. in the longitudinal direction and is mounted to a vertically sliding driving mechanism (not illustrated) so as to slide upward with the progress of the welding. Welding electrodes 26 and 27 are set respectively above the clearances 24 and 25. Cooling nozzles 32, 32' and 33, 33', for respectively cooling approximately 20 mm. below the electrodes, are positioned below the copper shoe 23 so that the electrodes, copper shoe and water-cooling nozzles may move integrally in the vertical direction. With the above described apparatus, when an electric current is passed through the welding electrodes 26 and 27 a layer of high notch toughness are deposited on the end surfaces of the base plates 20 and 21. The deposited metals 30 and 31 are formed to fill the clearances 24 and 25. While the electrodes, copper shoe and water-cooling nozzles are being moved upward at the welding speed, the welding is made, and the deposited metal, just after solidification, and the base plates near it, are quenched with cooling water jetted through the nozzles 32, 32' and 33, 33' so that the weld bond zone has a quenched structure. Then, as shown in FIG. 10, a vertically slidable copper shoe 38 is fitted between the end surfaces of the deposited metals 30 and 31, a welding electrode (not illustrated) set in the clearance 39 is moved upward together with the shoe 38 and an ordinary electrogas arc welding is made in the clearance 39 enclosed with the copper shoe 38 and deposited metals 30 and 31 so that the deposited metals 30 and 31 are joined with each other with any desired welding metal 40 (FIG. 11). If the welding is made as described above, the weld bonds 34 and 35 are tempered by the heat at the time of the welding so that the structure of the weld bond when subsequently quenched and tempered will prevent weld bond brittleness.

It is preferable that the high notch toughness steel to be deposited in advance on the root face of the joint of the steel plate is selected from alloys having 0.05 to 0.16% C, 0.30 to 0.80% Si, 0.80 to 2.50% Mn and 2.50 to 10.00% Ni as main components, containing less than 0.80% Mo and/or less than 0.50% Cr to provide strength, and having a total of 0.01 to 0.10 percent of one or more of Al, Ti, V, Nb and Zr added as required, the rest being substantially Fe. The reasons for limiting the composition are as follows. In consideration of the notch toughness, it is preferable that the carbon content is low. However, in order to secure strength, the carbon content is limited to be 0.05 to 0.16 percent of the total composition. In order to prevent the generation of blow holes in the deposited metal, it is necessary to add Si. But, too much Si, will increase the nonmetallic inclusion and reduce the notch toughness. Therefore, Si forms 0.30 to 0.80 percent of the total composition. Mn is an element particularly improving the notch toughness. However, too much Mn will cause the deposited metal to harden and its susceptibility to weld cracking will increase. It is therefore necessary to make the upper limit of Mn 2.50 percent of the composition. If Ni is added, the notch toughness can be improved without hardening the welded part. Therefore, Ni is the most effective element. In order to obtain a high toughness with such high heat input welding as in the present invention, it is necessary to add at least 2.50% Ni. However, if it exceeds 10.00 percent, the retained austenite will become excessive and a difference in the coefficient of expansion will be produced between the deposited metal and the base plate. It is therefore desirable that the upper limit of the addition of Ni is made less than 10 percent.

In order to increase the resistance to softening for a higher strength of deposited high notch toughness metal is required, it is desirable to add Cr and Mo alone or together by making 0.50% Cr and 0.80% Mo upper limits, because, with the increase of the strength of the deposited metal, the reduction of the notch toughness becomes remarkable.

Further, adding Al Ti, V, Nb and Zr alone or compositely in a range of 0.01 to 0.10 percent is more effective making crystal grains fine and to improve the notch toughness. Therefore, they are added in a small amount as required or depending on the object to be obtained.

Examples of the present invention are as follows.

EXAMPLE 1

Steel plates of a high tensile strength of 80 kg.mm². and thickness of 32 mm. (of the composition of Test No. 1 in Table 3) were set to form a V-section groove in a horizontal position. A high notch toughness deposited metal layer was formed by depositing the metal 5 mm. thick on each root face at a welding speed of 500 mm./min. by a weaving motion using a 5% Ni wire of a diameter of 1.6 mm. (of the composition of Test No. 1 in Table 4) in a carbon dioxide arc welding method. Then a welding was made with a heat input of 150,000 joules/cm. (with a welding current of 3,000 amperes consisting of 1,200 amperes at the first electrode, 1,000 amperes at the second electrode and 800 amperes at the third electrode, an arc voltage of 40 volts and a welding speed of 500 mm./min.) using wire electrodes of 4.8 and 6.4 mm. in diameter with a three-electrode submerged arc welding method from about 300 mm. behind it. The welding heat caused the weld bond to be of a normalized structure and had a great effect in preventing brittleness.

On the other hand, with as a conventional process, a welding was made with a heat input of 150,000 joules/cm. with a general submerged arc welding method without forming a high notch toughness deposited metal layer. 2 mm. V-notch charpy impact tests of the weld bonds of both were made. The results are shown as compared in the following Table 1.

TABLE 1

| Welding process | Characteristic values | | |
|---|---|---|---|
| | vTs (°C) | vEo (km.-m) | vT$_{15}$ (°C) |
| Process of the present invention | −15 | 8.7 | −75 |
| Conventional process | 68 | 1.2 | 9 |

Notes:
  vTs : Fracture transition temperature.
  vEo : Absorbed energy at 0°C.
  vT$_{15}$: Temperature at which the absorbed energy became 15 ft.-lbs. (2.07 kg.-m.)

EXAMPLE 2

Steel plates of a high tensile strength of 60 kg/mm². and thickness of 45 mm. (of the composition of Test No. 2 in Table 3) were first made to form an I-section joint by an electrogas arc welding method in a vertical position. A metal was deposited to be 4 mm. thick on each root face of the joint at a welding speed of 75 mm./min. by using a 4% Ni wire electrode of a diameter of 0.8 mm. (of the composition of Test No. 2 in Table 4) so as to form a deposited high notch toughness metal layer. A welding was made under the conditions of a heat input of 170,000 joules/cm. (of a welding current of 300 amperes, arc voltage of 30 volts and welding speed of 32 mm./min.) from about 1,000 mm. behind it while keeping a charging clearance of 8 mm. By this welding heat, the weld bond became a normalized structure and had a great effect in preventing brittleness. On the other hand, for comparison, a welding was made with a heat input of 170,000 joules/cm. 2 mm. V-notch charpy impact tests of the weld bonds of both were made. The comparative results are shown in Table 2. As compared with the conventional process, the fracture transition temperature is lower in the present invention in both examples 1 and 2 . It is evident that the notch toughness of the weld bond by the process of the present invention is favorable.

TABLE 2

| Welding process | Characteristic value | | |
|---|---|---|---|
| | vTs (°C) | vEo (kg.-m.) | vT$_{15}$ (°C) |
| Process of the present invention | 16 | 6.3 | −17 |
| Conventional process | 70 | 1.4 | 16 |

Notes:
  vTs : Fracture transition temperature.
  eVo : Absorbed energy at 0°C.
  vT$_{15}$: Temperature at which the absorbed energy became 15 ft.-lbs. (2.07 kg.-m.)

EXAMPLE 3

Figure 12:
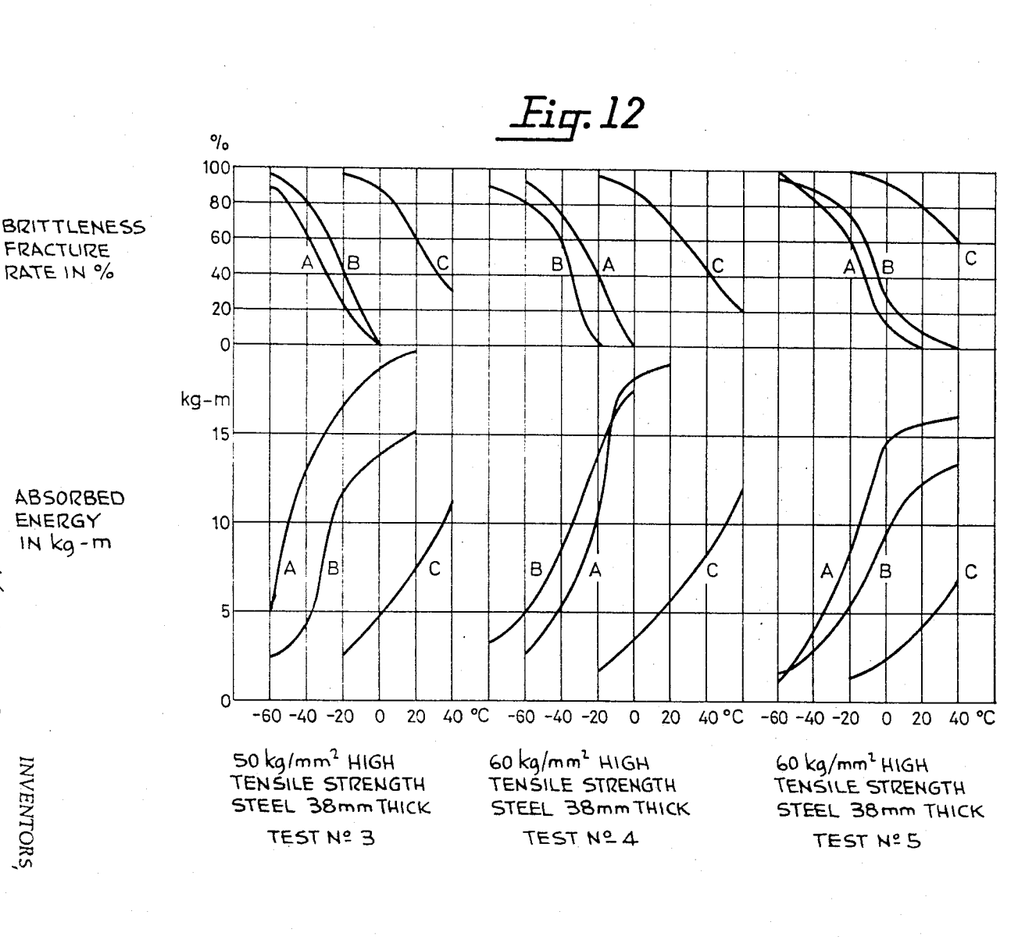
FIGS. 12 to 14 are diagrams of the impact properties of weld bonds according to the present invention as compared with those by conventional processes indicating the brittle fracture rate and absorbed energy curves for various types of steel.

Steel plates of a high strength of 50 kg/mm². and thickness of 38 mm. (Test No. 3), steel plates of a high strength of 60 kg/mm². and thickness of 38 mm. (Test No. 4) and steel plates of a high strength of 60 kg./mm². and thickness of 45 mm. whose respective chemical compositions and tensile properties are shown in Table 3 were used as samples. A high notch toughness metal layer was first deposited on each root face of an I-section at a speed of 17 to 20 mm./min. by using a 4% Ni electrode wire of a diameter of 1.2 mm. (See Table 4) with an electrogas arc welding method in a vertical position. Then an electrogas arc welding was applied by keeping the charging clearance 10 mm. to make a weld joint. By the welding heat at the time of the final jointing, the weld bond became a normalized structure and had a great effect in preventing brittleness. The respective welding conditions are shown in Table 5 and the impact properties of their weld bonds are shown in FIG. 12. The curve A represents the impact properties of the weld bond by the process of the present invention, the curve B represents those of the base plate itself and the curve C represents the conventional electrogas arc welding method shown for comparison. It is definitely shown that the impact properties of the weld bonds by the process of the present invention are much better than those by the conventional process and are never inferior to those of the base plate.

In the steel of a high strength of 50 kg./mm², and thickness of 38 mm. (Test No. 3) and steel of a high tensile strength of 60 kg./mm². and thickness of 45 mm. (Test No. 5), the impact properties of the weld bonds of the present invention show somewhat better results than those of the base plate. This is because the reheat-treatment at the time of the welding in the present invention greatly improved the structure of the base plate.

EXAMPLE 4

This example is an example of the modified process wherein the deposited metal, just after its solidification, and the base plate near it are quenched by using water-cooling nozzles jetting cooling water at the time of the step of depositing a high notch toughness metal to obtain a quenched structure in the weld bond. Then welding is made between the deposited metal layers, the weld bond is tempered by the welding heat at this time so as to be of a quenched and tempered structure to prevent bond brittleness.

Figure 13:
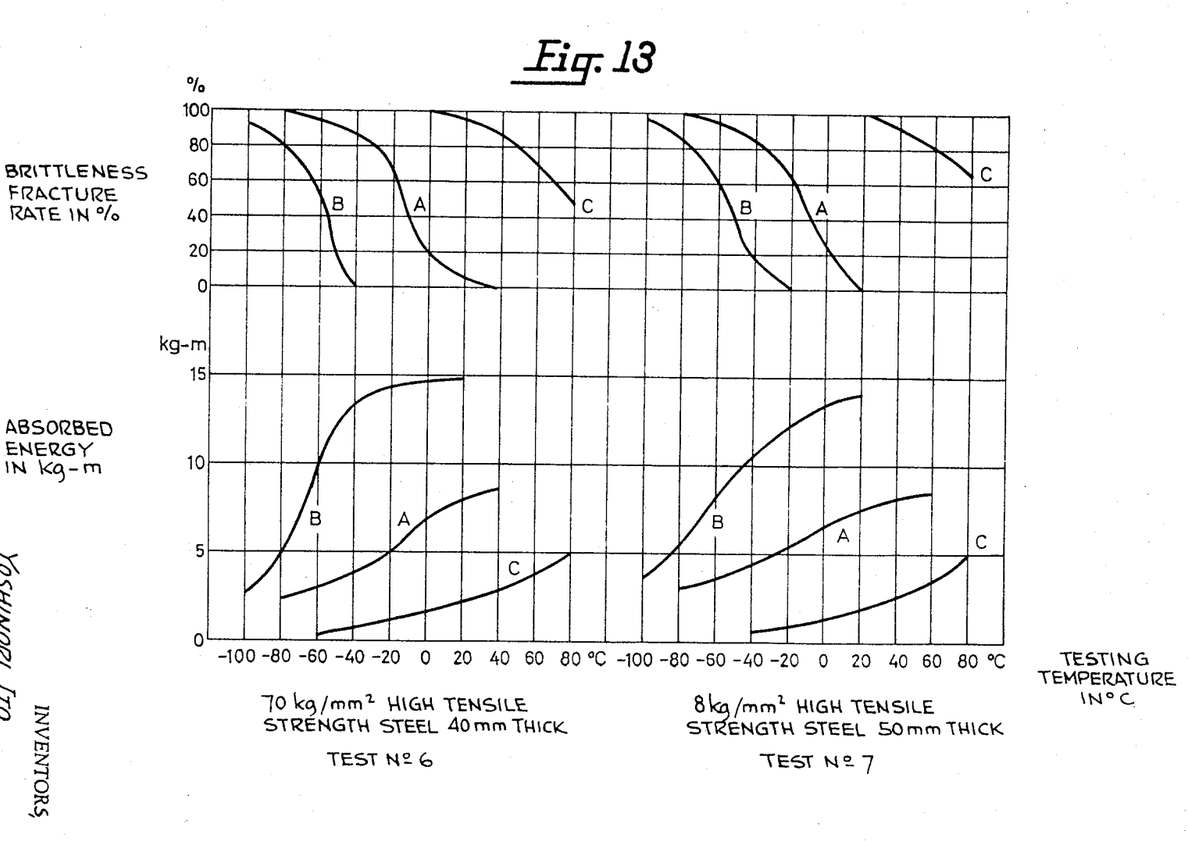
Figure 14:
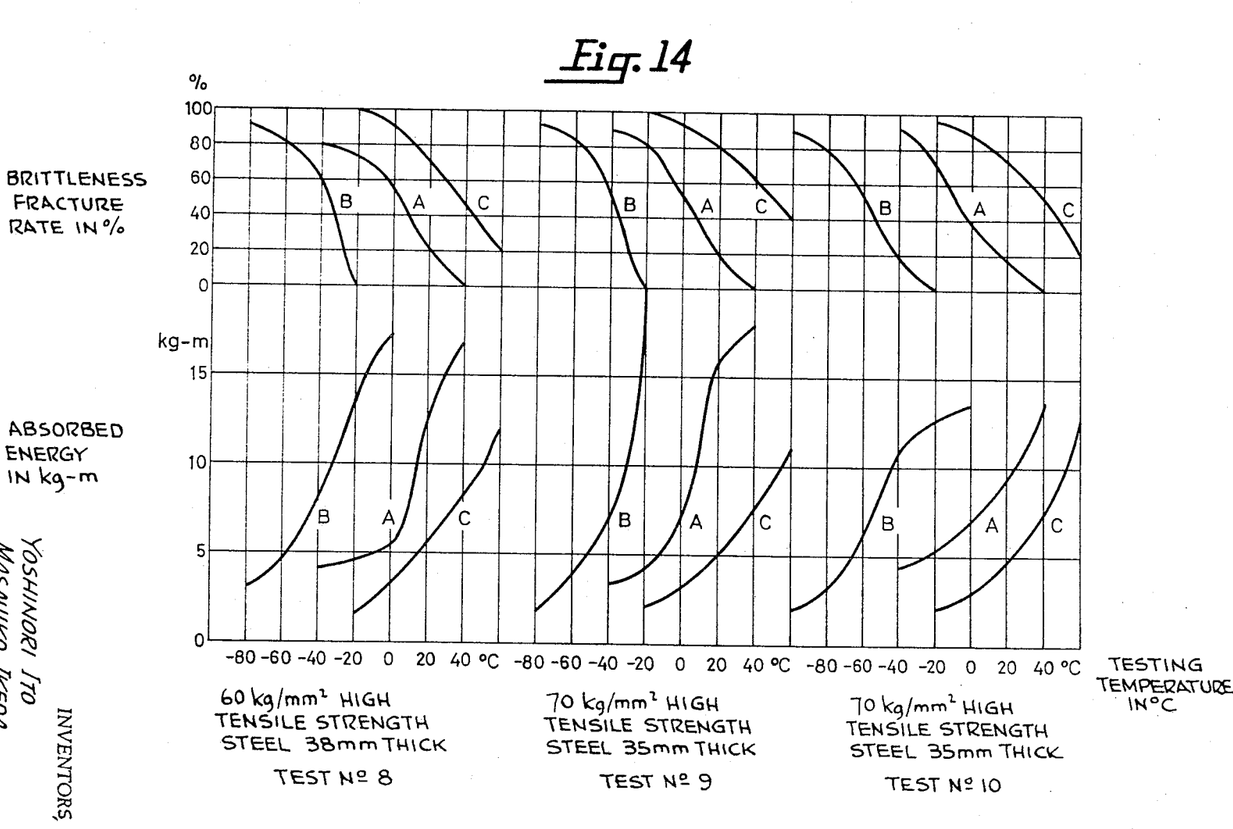

That is to say, a high strength steel of a strength of 60 to 80 kg./mm². as shown in Table 3 was worked to be a steel plate 35 to 50 mm. thick. This was used as a sample. The sample plates were welded under the welding and water-cooling conditions (shown in Table 6 by using an electrode wire of a diameter of 1.2 mm. shown in Table 4) and the impact properties of the weld bond were tested. The results are shown in FIGS. 13 and 14. The curve A represents the impact properties of the weld bond by the process of the present invention, the curve B represents those of the base plate itself and the curve C represent conventional electrogas arc welding as plotted to compare the effects of the present invention. This comparison clearly indicates the excellent impact properties of the weld bond by the process according to the present invention.

What is claimed is:

1. A welding process comprising the steps of; forming a root face on each portion of adjoining base plates, depositing a high notch toughness metal on each root face of a joint to form a weld bond between said deposited metal and said root faces, water-cooling said deposited metal layers and the base plates in the region of said joint to quench the weld bond, said water-cooling is applied to said deposited metal layers immediately after the solidification thereof, then welding said deposited high notch toughness metal layers tempering the quenched structure of the weld bond with the welding heat to prevent brittleness of the weld bond.

2. A welding process according to claim 1 wherein the high notch toughness metal to be first deposited on each root face of a joint is deposited by using an electrode wire made of an alloy containing 0.05 to 0.16% C, 0.30 to 0.80% Si, 0.80 to 2.50% Mn and 2.50 to Table 3

| SAMPLE STEEL | ITEMS | CHEMICAL COMPOSITION (%) | | | | | | | | | | TENSIL PROPERTIES | | TEST NO. |
|---|---|---|---|---|---|---|---|---|---|---|---|---|---|---|
| | | C | Si | Mn | P | S | Cu | Cr | Mo | Ni | V | YIELD POINT kg/mm² | TENSILE STRENGTH kg/mm² | |
| 32mm. thick 80 kg/mm² HIGH TENSILE STRENGTH STEEL | | 0.11 | 0.28 | 0.81 | 0.012 | 0.014 | 0.31 | 0.50 | 0.48 | 0.87 | 0.05 | 83.9 | 88.0 | 1 |
| 45mm. thick 60 kg/mm² HIGH TENSILE STRENGTH STEEL | | 0.16 | 0.36 | 1.39 | 0.019 | 0.015 | - | - | 0.11 | 0.19 | 0.05 | 55.2 | 65.4 | 2 |
| 38mm. thick 50 kg/mm² HIGH TENSILE STRENGTH STEEL | | 0.19 | 0.40 | 1.41 | 0.027 | 0.015 | - | - | - | - | - | 33.9 | 54.5 | 3 |
| 38mm. thick 60 kg/mm² HIGH TENSILE STRENGTH STEEL | | 0.14 | 0.45 | 1.39 | 0.017 | 0.015 | - | - | - | - | 0.07 | 48.1 | 67.2 | 4,8 |
| 45mm. thick 60 kg/mm² HIGH TENSILE STRENGTH STEEL | | 0.17 | 0.32 | 1.43 | 0.027 | 0.017 | - | - | - | 0.21 | 0.07 | 52.9 | 63.7 | 5 |
| 40mm. thick 70 kg/mm² HIGH TENSILE STRENGTH STEEL | | 0.11 | 0.30 | 0.79 | 0.013 | 0.010 | 0.02 | 0.42 | 0.47 | 1.31 | 0.03 | 64.6 | 74.4 | 6 |
| 50mm. thick 80 kg/mm² HIGH TENSILE STRENGTH STEEL | | 0.13 | 0.37 | 0.77 | 0.017 | 0.023 | 0.29 | 0.36 | 0.44 | 0.71 | 0.05 | 73.1 | 84.5 | 7 |
| 35mm. thick 70 kg/mm² HIGH TENSILE STRENGTH STEEL | | 0.11 | 0.27 | 0.78 | 0.016 | 0.013 | 0.04 | 0.37 | 0.37 | 1.02 | 0.03 | 64.8 | 72.9 | 9 |
| 35mm. thick 70 kg/mm² HIGH TENSILE STRENGTH STEEL | | 0.10 | 0.32 | 0.80 | 0.012 | 0.008 | 0.03 | 0.32 | 0.39 | 0.35 | 0.03 | 63.4 | 70.2 | 10 |

Table 4

| ELECTRODE WIRE | ITEMS | CHEMICAL COMPOSITION (%) | | | | | | | | | | TEST NO. |
|---|---|---|---|---|---|---|---|---|---|---|---|---|
| | | C | Si | Mn | P | S | Ni | Cr | Mo | V | Ti | |
| A | | 0.07 | 0.35 | 1.85 | 0.011 | 0.007 | 4.95 | 0.15 | 0.40 | - | 0.01 | 1 |
| B | | 0.07 | 0.62 | 1.50 | 0.013 | 0.010 | 3.67 | - | 0.25 | - | 0.01 | 2, 4, 5, 8 |
| C | | 0.08 | 0.57 | 1.72 | 0.007 | 0.012 | 3.45 | 0.45 | 0.48 | - | 0.03 | 6, 7, 9, 10 |
| D | | 0.07 | 0.60 | 1.43 | 0.008 | 0.008 | 2.97 | - | - | 0.02 | 0.03 | 3 |

Table 5

| STEPS | CONDITIONS | MATERIALS | 38mm THICK 50 KG/mm² HIGH TENSILE STRENGTH | 38mm THICK 60 KG/mm² HIGH TENSILE STRENGTH | 45mm THICK 60 KG/mm² HIGH TENSILE STRENGTH |
|---|---|---|---|---|---|
| BUTTERING STEP | WELDING METHOD | | ELECTROGAS ARC WELDING | ELECTROGAS ARC WELDING | ELECTROGAS ARC WELDING |
| | WELDING CURRENT Amp. | | 150 | 150 | 150 |
| | ARC VOLTAGE VOLT | | 22 | 22 | 23 |
| | WELDING SPEED mm/min. | | 20 | 20 | 17 |
| | ELECTRODE OSCILLATION | AMPLITUDE OF RECIPROCATION mm | 35 | 35 | 42 |
| | | OSCILLATING SPEED mm/sec. | 6 | 6 | 6 |
| | GAS SHIELD CONDITION | GAS COMPOSITION | CARBON DIOXIDE | CARBON DIOXIDE | CARBON DIOXIDE |
| | | FLOW VOLUME ℓ/min. | 20 | 20 | 20 |
| | CLEARANCE mm | | 7 | 7 | 7 |
| WELDING STEP | WELDING METHOD | | ELECTROGAS ARC WELDING | ELECTROGAS ARC WELDING | ELECTROGAS ARC WELDING |
| | WELDING CURRENT Amp. | | 300 | 300 | 300 |
| | ARC VOLTAGE Volt | | 30 | 30 | 30 |
| | WELDING SPEED mm/min. | | 35 | 35 | 30 |
| | ELECTRODE OSCILLATION | AMPLITUDE OF RECIPROCATION mm | 32 | 32 | 40 |
| | | OSCILLATING SPEED mm/sec. | 10 | 10 | 10 |
| | GAS SHIELD CONDITION | GAS COMPOSITION | CARBON DIOXIDE | CARBON DIOXIDE | CARBON DIOXIDE |
| | | FLOW VOLUME ℓ/min. | 20 | 20 | 20 |
| | CLEARANCE mm | | 10 | 10 | 10 |
| TEST NO. | | | 3 | 4 | 5 |

Table 6

| STEPS | CONDITIONS | | 40mm. thick 70 kg/mm² HIGH TENSILE STRENGTH STEEL | 50mm thick 80kg/mm² HIGH TENSILE STRENGTH STEEL | 38mm thick 60kg/mm² HIGH TENSILE STRENGTH STEEL | 35mm thick 70kg/mm² HIGH TENSILE STRENGTH STEEL | 35mm thick 70kg/mm² HIGH TENSILE STRENGTH STEEL |
|---|---|---|---|---|---|---|---|
| BUTTERING STEP | WELDING METHOD | | ELELECTROGAS ARC WELDING | The same as on the left | The same as on the left | The same as on the left | The same as on the left |
| | WELDING CURRENT Amp. | | 300 | 300 | 300 | 300 | 300 |
| | ARC VOLTAGE Volt | | 27 | 27 | 30 | 30 | 30 |
| | WELDING SPEED mm/min. | | 33 | 27 | 33 | 36 | 36 |
| | ELECTRODE OSCILLATION CONDITION | AMPLITUDE OF RECIPROCATION mm. | 36 | 46 | 35 | 32 | 32 |
| | | OSCILLATING SPEED mm/sec. | 10 | 10 | 6 | 6 | 6 |
| | GAS SHIELD CONDITION | GAS COMPOSITION | $CO_2$ | $CO_2$ | $CO_2$ | $CO_2$ | $CO_2$ |
| | | FLOW VOLUME ℓ/min. | 20 | 20 | 20 | 20 | 20 |
| | CLEARANCE mm. | | 13 | 13 | 12 | 12 | 12 |
| WATER COOLING STEP | NOZZLE POSITION | | 55mm. under the melting pool | 45mm. under the melting pool | 60mm. under the melting pool | 60mm. under the melting pool | 60mm. under the melting pool |
| | WATER COOLING CONDITION | NOZZLE ARRANGEMENT | Two nozzles of an inside diameter of 12mm. arranged on each of the front and back | Two nozzles of an inside diameter of 12 mm. arranged on each of the front and back | Two nozzle of an inside diameter of 12mm. arranged on each of the front and back | Two nozzles of an inside diameter of 12mm. arranged on each of the front and back | Two nozzles of an inside diameter of 12mm. arranged on each of the front and back |
| | | VOLUME OF COOLING WATER THROUGH EACH NOZZLE ℓ/min. | 5 | 5 | 3 | 3 | 3 |
| WELDING STEP | WELDING METHOD | | ELELECTROGAS ARC WELDING | The same as on the left | The same as on the left | The same as on the left | The same as on the left |
| | WELDING CURRENT Amp. | | 300 | 300 | 300 | 300 | 300 |
| | ARC VOLTAGE Volt | | 30 | 30 | 30 | 30 | 30 |
| | WELDING SPEED mm/min. | | 44 | 39 | 39 | 45 | 45 |
| | ELECTRODE OSCILLATION CONDITION | AMPLITUDE OF RECIPROCATION mm. | 36 | 46 | 30 | 27 | 27 |
| | | OSCILLATING SPEED mm/sec. | 10 | 10 | 6 | 6 | 6 |
| | GAS SHIELD CONDITION | GAS COMPOSITION | $CO_2$ | $CO_2$ | $CO_2$ | $CO_2$ | $CO_2$ |
| | | FLOW VOLUME ℓ/min. | 20 | 20 | 20 | 20 | 20 |
| | CLEARANCE mm. | | 9 | 9 | 8 | 8 | 8 |
| TEST NO. | | | 6 | 7 | 8 | 9 | 10 |

10.00% Ni as main components and having a total of 0.01 to 0.10 percent of elements from the group consisting of Al, Ti, V, Nb and Zr, and the remainder of the electrode is substantially Fe.

3. A welding process according to claim 1 wherein the high notch toughness metal to be first deposited on each root face of a joint is deposited by using an electrode wire made of an alloy of a composition containing 0.50% Cr and 0.80% Mo as an upper limit, 0.05 to 0.10% C, 0.30 to 0.80% Si, 0.80 to 2.50% Mn and 2.50 to 10.00% Ni, a total of 0.01 to 0.10 percent of elements from the group consisting of Al, Ti, V, Nb and Zr, and the rest of the electrode is substantially Fe.

4. A welding process according to claim 1 wherein the high notch toughness metal to be first deposited on each root face of a joint is deposited by using an electrode wire made of an alloy containing 0.05 to 0.10% C, 0.30 to 0.80% Si, 0.8 to 2.50% Mn, 2.5 to 10.00% Ni, less than 0.50% Mo, 0.01 to 0.10% Ti, and the remainder of the electrode is substantially Fe.

* * * * *